United States Patent [19]

Pelton et al.

[11] 3,896,391

[45] July 22, 1975

[54] HIGH SPEED VIDEO DIVIDER WITH COMPENSATION FOR NON-LINEAR FUNCTIONS

[75] Inventors: Frank M. Pelton, Clarence; Joseph A. Bruder, Snyder; Thomas F. Leney, Elma, all of N.Y.

[73] Assignee: Calspan Corporation, Buffalo, N.Y.

[22] Filed: Feb. 11, 1974

[21] Appl. No.: 441,527

[52] U.S. Cl. .................................. 328/161; 235/196

[51] Int. Cl. .................................. G06g 7/16

[58] Field of Search .................. 328/161; 235/196

[56] References Cited

UNITED STATES PATENTS 3,691,473 9/1972 Boatwright ..................... 328/161 X

*Primary Examiner*—Nathan Kaufman

*Attorney, Agent, or Firm*—Allen J. Jaffe

[57] ABSTRACT

A wide - bandwidth divider which is capable of dividing video signals in the frequency range extending from d.c. to a desired frequency such as 5 mergahertz and incorporating special compensation of the input signals to linearize the output signal.

8 Claims, 5 Drawing Figures

HIGH SPEED VIDEO DIVIDER WITH COMPENSATION FOR NON-LINEAR FUNCTIONS

In radar and other systems it is necessary to divide one electrical signal into a second electrical signal to obtain a resultant electrical signal which is the quotient of the two signals. While such devices can readily be built for low frequencies, available video dividers cannot cover a frequency range such as from d.c. to 5 megahertz with the requisite accuracy and d.c. stability. Additionally, in such systems the input signals are frequently related to the desired output function in a non-linear fashion. In such cases it is desirable to incorporate special compensation of the input signals to linearize the output signal.

It is an object of this invention to provide a video divider operative over the frequency range extending from d.c. to 5 megahertz.

It is a further object of this invention to compensate the input signals to a video divider to linearize the output signal. These objects, and others as will become apparent hereinafter, are accomplished by the present invention.

Basically the present invention provides a wide-bandwidth divider for dividing signals over a wide frequency range and for compensating the resulting signal. A plurality of comparators are divided into two equal groups with each member of the first group receiving a first signal and a second signal which is divided by resistor means and each member of the second group receiving the first signal and an inverted second signal which is divided by resistor means. Circuit means coact with the plurality of comparators to give an indication of the magnitude of the first signal divided by the second signal.

BRIEF DESCRIPTION OF THE DRAWINGS

For a fuller understanding of the present invention, reference should now be had to the following detailed description thereof taken in conjunction with the accompanying drawings wherein:

FIG. 1 presents a circuit diagram for a wide-bandwidth video divider whose output, F, is the ratio of the two input video signals. A and B, with the restriction that the divider signal, B, is always a positive function. The divider circuitry consists of an inverting circuit 17 to provide a negative B signal, positive comparators 15, negative comparators 16, summing resistors $R_{S1}$, $R_{S2}$, . . . $R_{SN\text{-}1}$, $R_{SN}$ and $R'_{S1}$, $R'_{S2}$ . . . $R'_{SN\text{-}1}$, and $R'_{SN}$, and a summing amplifier 30. The positive and negative comparators 15 and 16 are composed of groups of individual comparator circuits as shown in FIG. 2. The comparators are divided into two equal groups, positive comparators 15 and negative comparators 16. For the positive comparators 15, the B signal which by definition is always positive is divided by resistors R1, R2, . . . RN-1 and RN and similarly for the negative comparators 16, the −B signal is divided by resistors R'1, R'2, . . . R'N-1 and R'N. For linear division R2 through RN and R'2 through R'N are all equal and R1 and R'1 are of one half the value of the other resistors.

The numerator input signal A is supplied via line 11, the denominator input signal B is supplied via line 12 and the quotient output F which is equal to $k(A/B)$, where $k$ is the gain, is supplied via line 13 as the output of summing amplifier 30. Output F can be supplied as an input to a digital tape recorder, a circuit using the ratio of the video signals, etc. The A signal is supplied via line 11 as the numerator inputs to comparators C1, C2, . . . CN-1 and CN which comprise the positive comparators generally designated 15 and to comparators C'1, C'2, . . . C'N-1 and C'N which comprise the negative comparators generally designated 16. The B signal is supplied via line 12 as the denominator input to comparator CN, via line 12 and resistor RN to comparator CN-1, . . . via line 12 and resistors RN, RN-1, . . . and R2 to comparator C1, and is connected via line 12 and resistors RN, RN-1, . . . R2 and R1 to ground. The B signal is supplied via lines 12 and 12 *a* to inverting amplifier circuit 17 which includes resistors 18 and 20 and inverting amplifier 19. The inverted signal, −B, is supplied via line 12*b* as the denominator input to comparator C'N, via line 12*b* and resistor R'N to comparator C'N-1, . . . via line 12*b* and resistors R'N, R'N-1, . . . and R'2 to comparator C'1 and is connected via line 12*b* and resistors R'N,R'N-1, . . . R'2 and R'1 to ground. 12b Since comparators C1, C2, . . . CN and C'1, C'2 . . . C'N are identical except for the values of the input signals, only the circuitry for comparator CN will be described in detail. Referring to FIG. 2, comparator CN includes an integrated circuit device 50 featuring fast switching between output states and having eight terminals which are numbered on the drawing. The A signal is supplied to terminal 2 via line 11 and resistor 51 and the B signal is supplied to terminal 3 via line 12 and resistor 52. Terminal 8 is connected to a source of positive d.c. voltage via resistor 54 and to ground via capacitor 55. Terminal 4 is connected to a source of negative d.c. voltage via resistor 58 and to ground via capacitor 59. Terminals 1, 5 and 6 are connected to ground and the output of integrated circuit device 50 is supplied to line 62 which is connected to terminal 7. Line 62 contains resistor $R_{AN}$ and leads to junction *a*. A clamping voltage, $V_C$, is supplied by a stable d.c. voltage source and is connected to junction *a* via line 62*b* which contains diode $D_{CN}$. Line 62*a* is connected to junction *a* and contains diode $D_N$ and summing resistor $R_{SN}$ with point *b* being located intermediate diode $D_N$ and summing resistor $R_{SN}$. $V_2$ and $V_3$ are the voltages at terminals 2 and 3, respectively, and $V_a$ and $V_b$ are the voltages at junction *a* and point *b*, respectively. When $V_2$ is less than $V_3$, the output of comparator CN will be in the "low" state (less than 0 volts); as $V_2$ exceeds $V_3$ the output will rapidly switch to a "high" state (greater than 2.5 volts). In the high state diode $D_{CN}$ will conduct and $V_a$ will be clamped to the voltage $V_C$ plus the diode drop voltage. Diode $D_N$ will also conduct and voltage $V_b$ will be equal to $V_a$ minus the diode drop voltage. Thus, if the voltage drops across the diodes $D_{CN}$ and $D_N$ are similar, then voltage $V_b$ will essentially be equal to $V_C$ when $V_2$ is greater than $V_3$. $V_C$ is supplied by a stable d.c. voltage source thus assuring a consistent voltage at $V_b$ when the comparator output is in the high state.

Since the linear division resistors R2 through RN and R'2 through R'N are equal and twice the value of resistors R1 and R'1, the B and −B voltages are divided into equal increments, except for comparators C1 and C'1 whose input is half the normal increment. When A is zero or negative, all of the positive comparator outputs are low so that all the diodes $D_1$ through $D_N$ are back-biased and the current $C_{SP}$ which is supplied by the positive comparators 15 through positive summing resistors $R_{S1}$ through $R_{SN}$ to summing amplifier 30 is essentially zero. When A is zero or positive, all of the negative comparator outputs are low so that diodes $D'_1$ through $D'_N$ are back-biased. Thus when the A input is zero and the B input is some positive value, diodes $D_1$ through $D_N$ are back-biased and current $C_{SP}$ is zero; and similarly diodes $D'_1$ through $D'_N$ are back-biased and the current $C_{SN}$ which is supplied by the negative comparators 16 through negative summing resistors $R'_{S1}$ through $R'_{SN}$ to summing amplifier 30 is zero. Since current $C_{SP}$ is zero, the voltage in resistor $R_P$ in summing amplifier 30 is zero, and since current $C_{SN}$ is zero the output F of summing amplifier 30 will be zero. This technique provides excellent stability for the A equal to zero condition and insures for stable d.c. operation.

Figure 3:
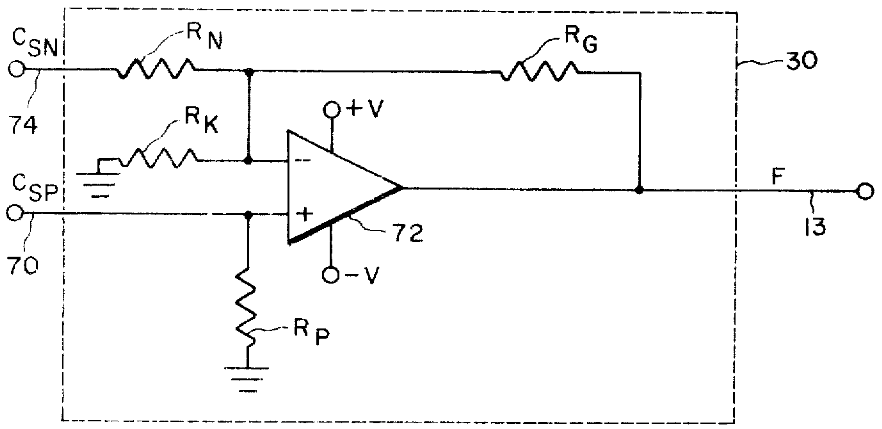
FIG. 3 is a circuit diagram of the summing amplifier of FIG. 1.

The scaling factors selected for A and B will determine the full scale range of operation of the device since when $A>B$ the comparators will no longer be switched in and so the range of division is for $A$ $B$. When A is greater than zero, the number of positive comparators in the high state is proportional to $A/B$; if, for example, $A = 1/5B$, and if there are a total of 25 positive comparators, then the first five positive comparators (C1 to C5) will be high. The current $C_{SP}$ is the sum of the currents through $R_{S1}$, $R_{S2}$, $R_{S3}$, $R_{S4}$ and $R_{S5}$. The resistor values $R_{S1}$, $R_{S2}$, . . . $R_{SN-1}$, $R_{SN}$ and $R_P$ are calculated such that the current $C_{SP}$ into resistor $R_P$ is proportional to the number of comparators in the high state. As best shown in FIG. 3, the current $C_{SP}$ is transmitted via line 70 to summing amplifier 30 and is transmitted primarily through resistor $R_P$ since the input resistance of the positive input of operational amplifier 72 is much greater than that of resistor $R_P$, and the voltage across resistor $R_P$ into the positive terminal of operational amplifier 72 is proportional to the current $C_{SP}$ through resistor $R_P$. The voltage across resistor $R_P$ will be positive and equal to one-fifth of the voltage when all of the positive comparators 15 are high. The negative comparators 16 are all back-biased in this case, therefore, current $C_{SN}$ will be zero. In this mode, the operational amplifier 72 acts as a voltage follower and the output voltage F transmitted to line 13 is proportional to $C_{SP}$. Therefore, for positive A the output voltage F is proportional to $A/B$.

When A is less than zero, all of the positive comparators 15 are in the low state, and the number of negative comparators 16 in the high state is equal to the number of negative comparators 16 for which the A input is more negative than the dividend −B inputs to those comparators, i.e. $V_3$ is more negative than $V_2$. In a similar manner (as for the case when A is positive) the output current $C_{SN}$ transmitted via line 74 to summing amplifier 30 is positive and is proportional to the ratio $A/B$ when A is less than zero. Since the diodes $D_1$ through $D_N$ are back-biased, the current $C_{SP}$ will be zero and hence the voltage across resistor $R_P$ will be zero. Current $C_{SN}$ is transmitted to summing resistor $R_N$ which is connected to the inverting node of operational amplifier 72 so that a positive current $C_{SN}$ will result in a negative output voltage F which is proportional to $A/B$.

The gain in summing amplifier 30 is determined by resistors $R_G$, $R_P$, $R_N$ and $R_K$ whose values are chosen such that the gain ($k$) is the same for both positive and negative A. Thus for a positive B voltage, the output F is zero when A is zero; F is positive and equal to $k(A/B)$ when $A$ is positive; and, F is negative and equal to $k$ $(A/B)$ when $A$ is negative.

Figure 4:
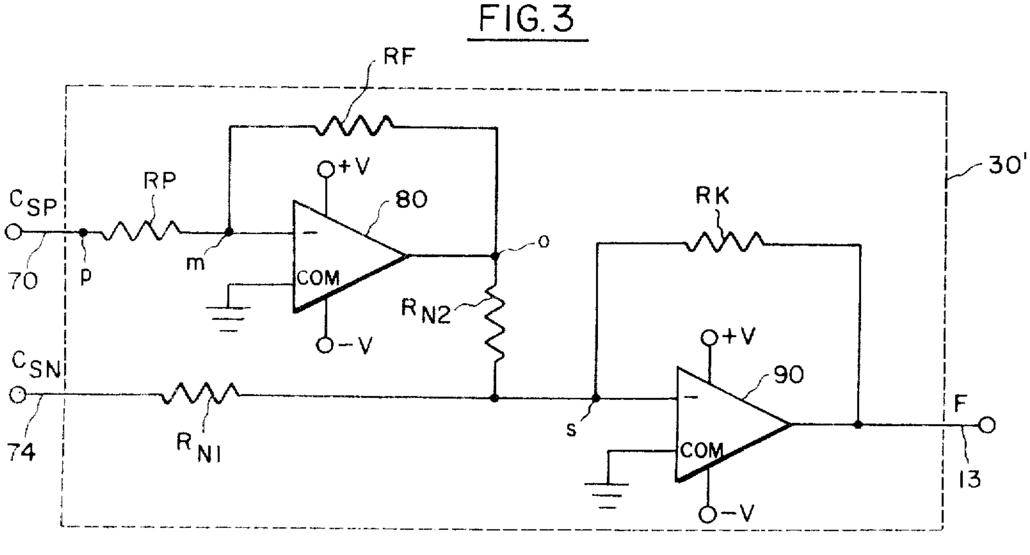
FIG. 4 is a circuit diagram of a modified summing amplifier.

A modified summing amplifier generally designated 30' is presented in FIG. 4. For a positive A signal into the video divider circuit a positive current $C_{SP}$ is transmitted through line 70 through resistor RP into the inverting node $m$ of amplifier 80. Resistor RF is equal to resistor RP, thus the voltage $V_o$ at node $o$ is equal to $-V_p$ where $V_p$ is the voltage at point $p$. The resistance of resistor $R_{N2}$ is set to be equal to that of resistor RP, thus the voltage $V_o$ causes a current $-C_{SP}$ to flow through resistor $R_{N2}$ into inverting node $s$ of amplifier 90. Since for a positive A signal current $C_{SN}$ is zero, the output voltage at line 13 is positive and proportional to $-V_o$, and hence to $C_{SP}$ and to $A/B$.

When signal A is negative current $C_{SN}$ is positive and flows through line 74 and through resistor $R_{N1}$ into the inverting node $s$ of amplifier 90. Resistor RK controls the gain of amplifier 90 and hence the scale factor of output F. Since for negative A current $C_{SP}$ is zero, the current through $R_{N2}$ is zero, therefore output F will be negative and proportional to $-C_{SN}$ and hence to $A/B$. If the resistors RP, RF, $R_{N1}$ and $R_{N2}$ are all equal, the output F will be equal to $k(A/B)$ for both positive and negative A.

Figure 1:
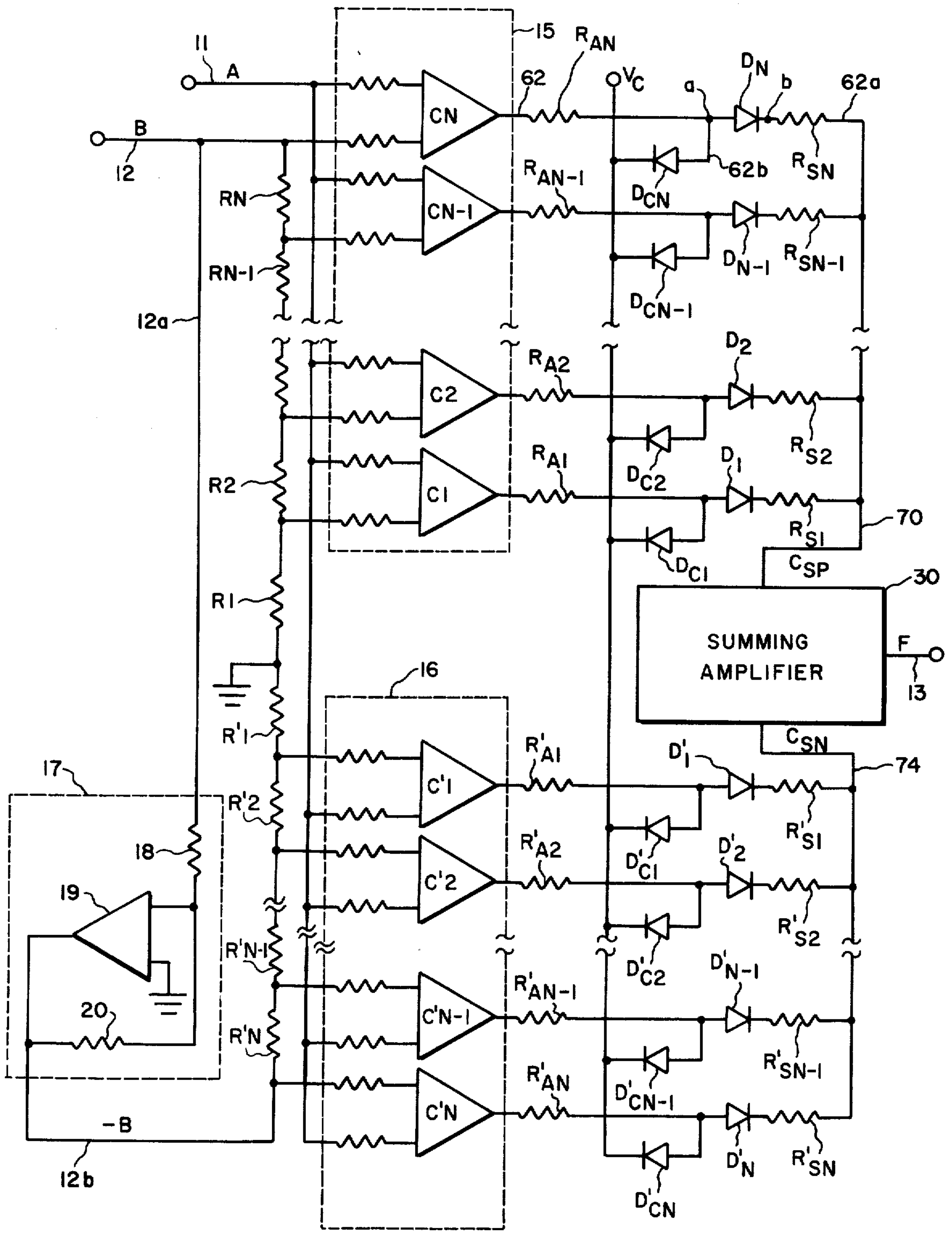
FIG. 1 is a circuit diagram of a video divider.
Figure 2:
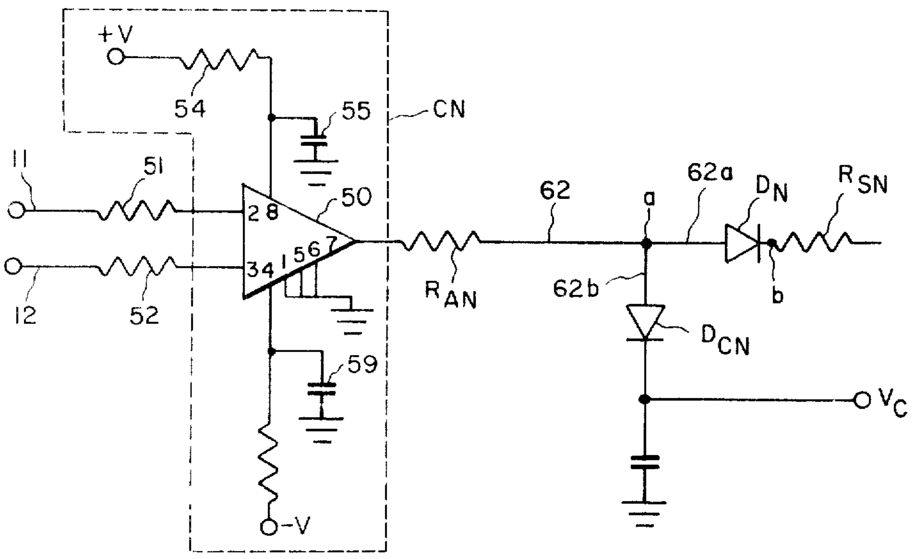
FIG. 2 is a circuit diagram of one of the comparators of FIG. 1.
Figure 5:
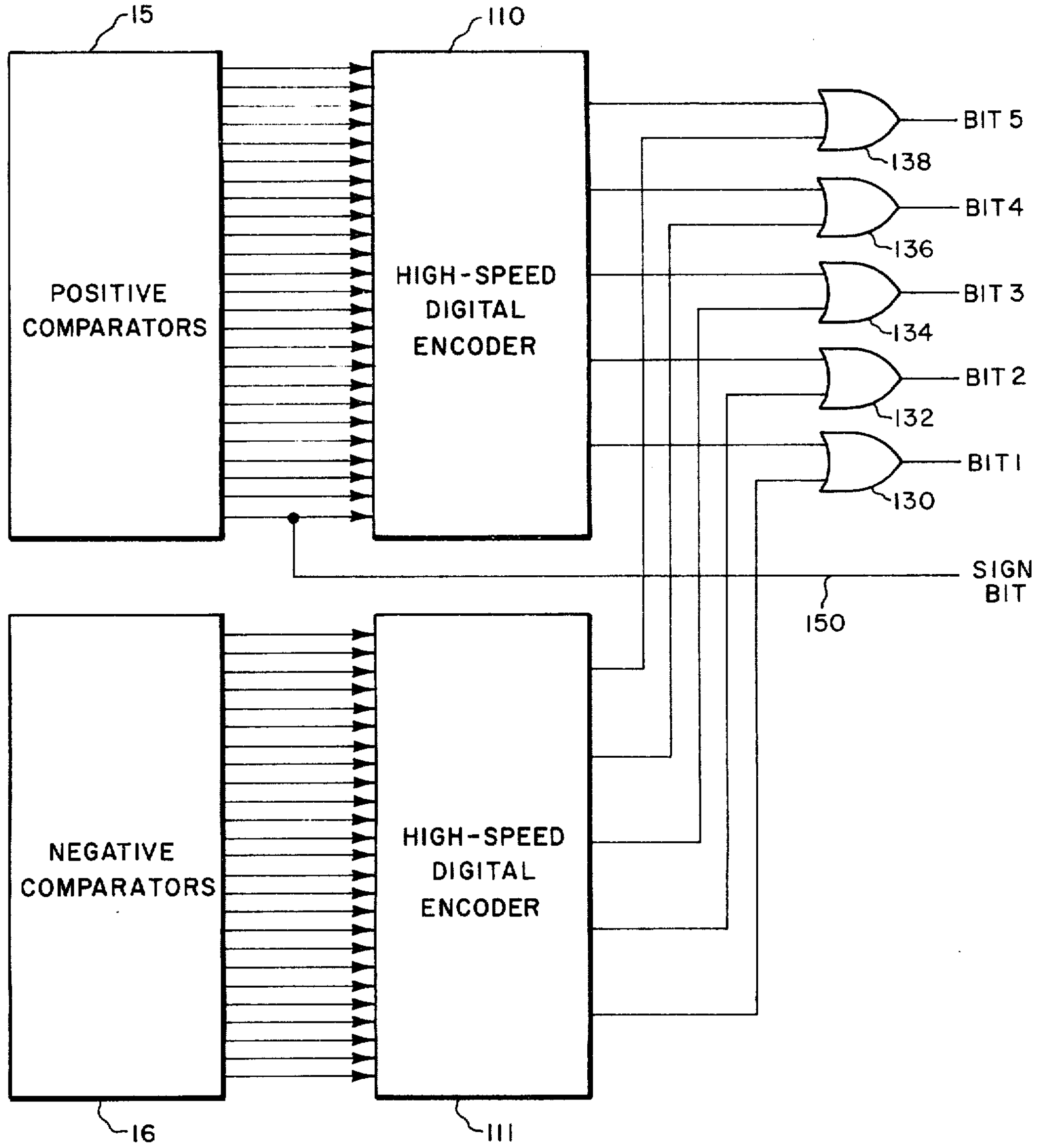
FIG. 5 is a modified circuit diagram of the video divider of FIG. 1 for producing a binary output.

FIG. 5 presents an alternative embodiment of the divider in which the outputs of the comparators are directly encoded into a digital representation of the quotient, rather than converting the comparator outputs back into the analog representations via the summing amplifier as is done in the divider of FIG. 1. Positive comparators 15 and negative comparators 16 are identical to those of FIG. 1 and would receive their input signals in the same manner. As illustrated, positive comparators 15 and negative comparators 16 are each made up of 25 comparators. The output of each of the 25 comparators comprising positive comparators 15 is supplied to high-speed digital encoder 110 and, similarly, the output of each of the twenty-five comparators comprising negative comparators 16 is supplied to high-speed digital encoder 111. Digital encoders 110 and 111 are composed of high-speed logic circuits and serve to maintain the bandwidth of the divider. Logic gates 130, 132, 134, 136 and 138 which are illustrated as "OR" gates are each connected to both high-speed encoder 110 and high-speed encoder 111. The outputs of the comparators comprising positive comparators 15 and negative comparators 16 are fed to digital encoders 110 and 111 whose outputs would be the binary representation of the number of positive or negative comparators, respectively, in the high state. If, for example, nineteen of the positive comparators are in the high state the output of digital encoder 110 and OR gates 130, 132, 134, 136 and 138 would be 10011 and the output of digital encoder 111 would be 00000. Likewise, if nineteen of the negative comparators are in the high state the output of digital encoder 111 and OR gates 130, 132, 134, 136 and 138 would be 10011 and the output of digital encoder 110 would be 00000.

Since concurrent outputs of the positive and negative comparators cannot take place, a signal indicative of the sign of the outputs is necessary. The sign of the output would be determined by determining whether comparator C1 or C'1 (see FIG. 1) is in the high state and generating a sign bit. As illustrated, line 150 is connected to the output of comparator C1 to provide a sign bit. Thus for a fifty comparator divider, the output would be a six bit binary digital number with one sign bit and five bits representing the magnitude.

In a monopulse radar, the angle of arrival, $\beta$, of the radar echo from a target can be determined from the ratio of the real component of the difference signal, $\Delta \cos \phi$, to the sum signal $\Sigma$, where $\phi$ is the phase angle between the $\Sigma$ and $\Delta$ signals. In such systems, the input signals are related in a non-linear fashion to the angle of arrival from the target. If the present invention is employed to divide the difference signal $\Delta \cos \phi$ by the sum signal $\Sigma$ with special compensation on the sum input the output is linearly proportional to the angle of arrival of the target echo.

To adapt the system of FIG. 1 to use in a monopulse radar system, the values of the resistors R1 to RN and R'1 to R'N need only be calculated to give equal angular increments on a plot of $\beta$ vs.

$$\frac{\Delta \cos \phi}{\Sigma}.$$

In such a system A will be the $\Delta \cos \phi$ signal, B will be the $\Sigma$ signal and F will equal $k' (A/B)$ where $k'$ is a non-linear constant dependent upon the angle of arrival.

Although preferred embodiments of the present invention have been illustrated and described, other changes will occur to those skilled in the art. For example, the number of comparators used will be determined by the desired resolution in that range; also, the FIG. 5 device could be modified by using NOR gates in place of the illustrated OR gates by having the digital encoders produce the reciprocal signal. It is therefore intended that the scope of the present invention is to be limited only by the scope of the appended claims.

We claim:

1. A wide - bandwidth divider for dividing signals over a wide frequency range and for compensating a resulting signal including:
   - means for supplying a first input signal;
   - means for supplying a second input signal;
   - first comparator means including a plurality of comparators;
   - second comparator means including a plurality of comparators equal to the number of comparators in said first comparator means;
   - first resistor means for dividing said second input signal and supplying a divided second input signal to each comparator in said first comparator means;
   - inverting circuit means for changing the sign of said second input signal to provide an inverted second input signal;
   - second resistor means for dividing said inverted second input signal and supplying a divided inverted second input signal to each comparator in said second comparator means;
   - means for supplying said first input signal to each comparator in said first and second comparator means;
   - circuit means coacting with said first and second comparator means, respectively, to produce a signal which is an indication of the polarity and magnitude of the value of said first signal divided by said second signal.

2. The divider of claim 1 wherein when said first input signal is positive a significant divided second input signal is supplied to a number of the comparators in said first comparator means determined by the intensity of the second input signal.

3. The divider of claim 2 wherein when said first input signal is negative, a significant divided inverted second input signal is supplied to a number of the comparators in said second comparator means determined by the intensity of the second input signal.

4. The divider of claim 3 wherein each of the comparators of said first comparator means compares the first input signal supplied thereto with the divided second input signal supplied thereto whereby, when the first input signal is a positive value each of those comparators in said first comparator means which receives a significant divided second input signal will produce a significant output signal which is supplied to said circuit means.

5. The divider of claim 4 wherein each of the comparators of said second comparator means compares the first input signal supplied thereto with the divided inverted second input signal supplied thereto whereby, when the first input signal is a negative value each of those comparators in said second comparator means which receives a significant divided inverted second input signal will produce a significant output signal which is supplied to said circuit means.

6. The divider of claim 5 wherein said circuit means includes a summing amplifier and where the significant output signals supplied by the comparators of said first and second comparator means are each summed and provide respective first and second inputs to said summing amplifier.

7. The divider of claim 6 wherein the first input signal is a difference signal from a monopulse radar and the second input signal is a sum signal from a monopulse radar.

8. The divider of claim 5 wherein said circuit means includes:
   - logic gate means;
   - first high-speed digital encoder means connected to said first comparator means and said logic gate means and providing a signal at said logic gate means in response to the significant output signals supplied by said first comparator means; and
   - second high-speed digital encoder means connected to said second comparator means and said logic gate means and providing a signal at said logic gate means in response to the significant output signals supplied by said second comparator means.

* * * * *